UNITED STATES PATENT OFFICE.

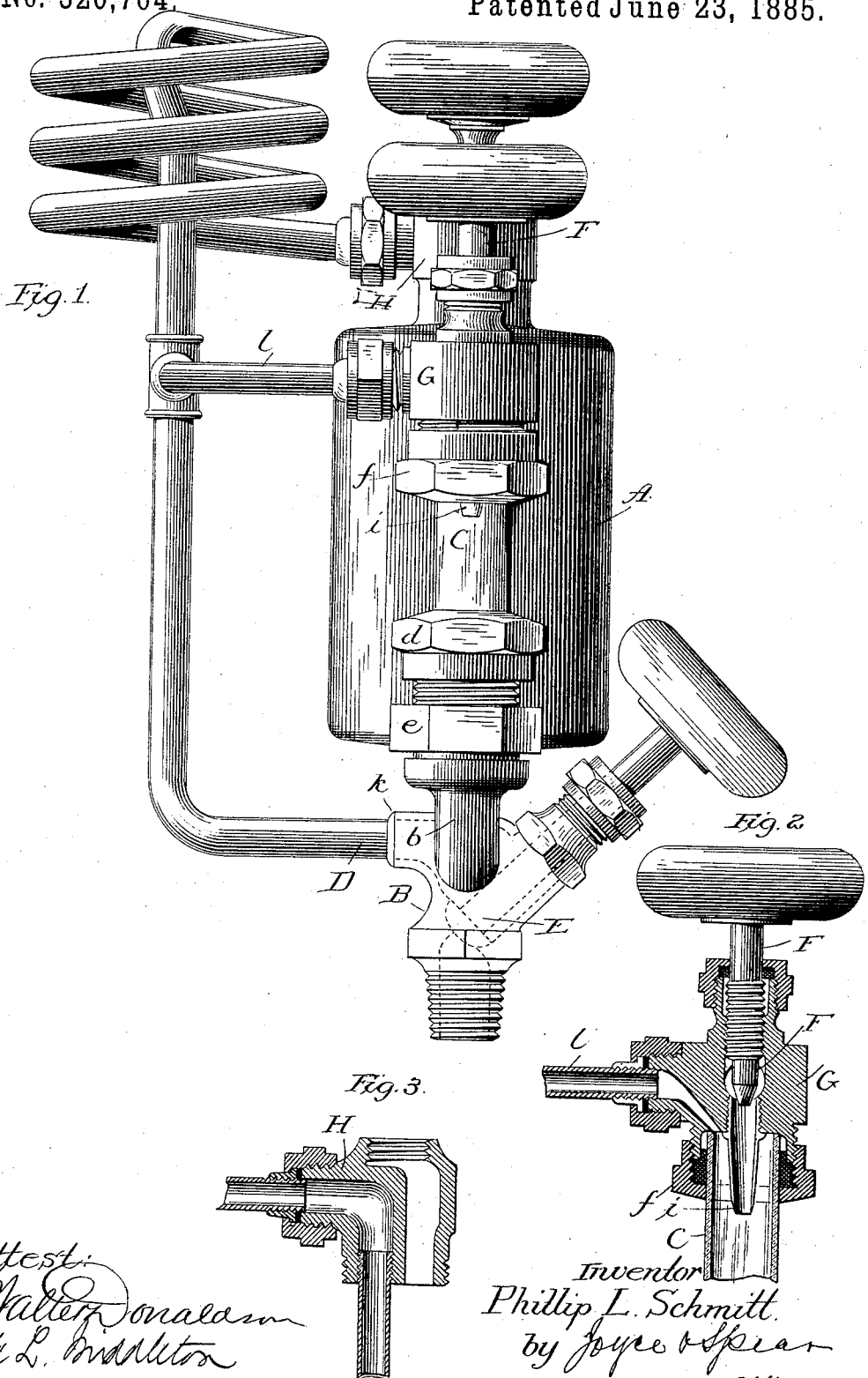

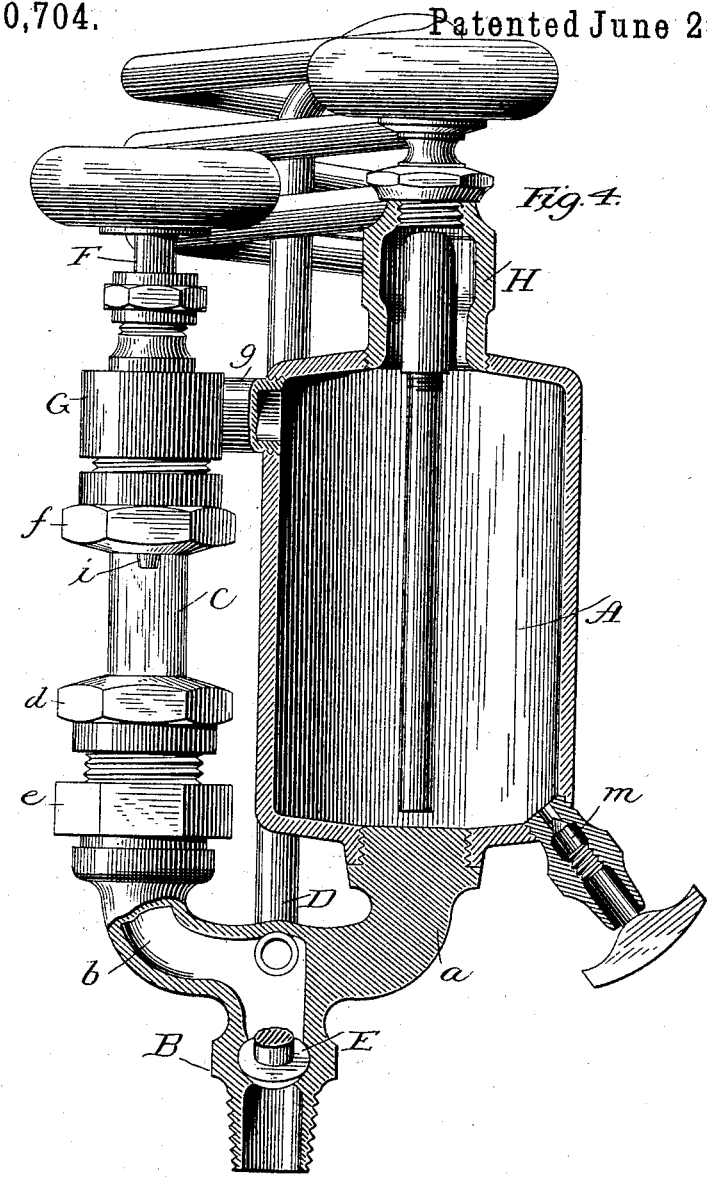

PHILLIP L. SCHMITT, OF QUINCY, ILLINOIS, ASSIGNOR TO THE PEERLESS OIL EJECTOR COMPANY, OF SAME PLACE.

LUBRICATOR.

SPECIFICATION forming part of Letters Patent No. 320,704, dated June 23, 1885.

Application filed April 10, 1885. (No model.)

*To all whom it may concern:*

Be it known that I, PHILLIP L. SCHMITT, of Quincy, in the county of Adams and State of Illinois, have invented a new and useful Improvement in Lubricators; and I do hereby declare that the following is a full, clear, and exact description of the same.

My invention is an improvement upon lubricator-cups of that class in which the oil is fed to the engine by displacement caused by the condensation of the steam conducted from the boiler-space into the oil-cup. The displaced oil is thence conducted to the working parts of the engine.

The object of my invention is to render the parts more compact and to simplify the construction.

In the accompanying drawings, Figure 1 shows an elevation of the improved cup. Fig. 2 is a detail sectional view of the drip-tube and its valve, showing, also, the connection with the equalizing-pipe. Fig. 3 is a detail sectional view. Fig. 4 is a side elevation, with the reservoir in section, and the branched stem also in section.

In the drawings, A represents the oil-reservoir, of the ordinary cylindrical form, but cast without any bosses or projections. It is supported upon a branched stem, B, which is screwed into any suitable steam-connection, whereby steam may be taken from the boiler-space and oil may be transmitted to the parts which are to be lubricated. The stem B is threaded at its lower end for this connection. It has two branches, *a b*, the branch *a* being solid and supporting the reservoir A. The branch *b* is tubular, and is connected with the glass tube, which forms a sight-feed. The lower end of the glass tube C is connected by suitable coupling-pieces, *d e*, and packing to the branch *b*. The upper end of the tube is connected by a coupling, *f*, and packing to a cap, G. This cap G has a stem, *g*, screwed into the body of the reservoir, near its upper end, and through this stem and the cap G a passage is formed for the displaced oil to a drip-nozzle, *i*, in the glass tube. It will be understood that the stem forms communication between the reservoir and the glass tube. At the junction of the passage in the branch *b* with the tube leading into the steam-space is a pipe, D, inserted into a nipple, *k*, cast into one piece with the stem B. Upon the other side of the stem, directly opposite the connection of the pipe D, but seated a little lower, is a valve, E, which is adapted to close the communication between the cup and the steam-space below the junction of the passages in the branch *b* and the pipe D, so that by closing this one valve steam may be wholly shut off from the cup, and the flow of oil excluded at the same time, and this single valve takes the place of two valves heretofore used. The cap G is provided with a regulating-valve, F, and it also has an equalizing-pipe, *l*, connected with it, and also connected at the other end with the pipe D by means of an ordinary T-coupling. The upper end of the pipe D is bent over and coiled about itself to form a condenser. The end is then carried laterally, and is connected by a suitable coupling to a plug, H, which is connected to the upper end of the reservoir, and this plug is the filling-orifice, provided with an ordinary screw-stopper. At the bottom of the reservoir is a drain-cock, *m*, for drawing off the water of condensation.

In the operation of the machine the steam is introduced through the stem B and rises through the pipe D, in the coil of which it condenses and flows as water of condensation into the cup, where it displaces the oil in the ordinary manner. The oil displaced runs off through the stem *g* into the cap G and drops from the nipple through the glass tube, flows down through the branch *b* into the steam-passage, and thence to the parts to be lubricated. Part of the steam from the pipe D is diverged to the cap and equalizes the pressure in the passage between the oil-cup and the glass tube, thereby aiding to keep those passages warm and prevent any obstruction therein.

I claim as my invention—

1. The combination, in a lubricator, of a central stem, B, adapted to be connected with the steam-space branches *a b*, extending laterally from said stem, the branch *a* being solid and adapted to support the reservoir, and the branch *b* being adapted to support the glass tube arranged parallel with the reservoir, substantially as described.

2. The combination, in a lubricator, of the reservoir A, the stem B, having branch $a$ for the support of said reservoir, and branch $b$ for the support of the glass tube, arranged parallel to the said reservoir, the pipe D, connected with the stem B, extending upward and coiled about itself, the end of the coil being connected with the reservoir and communicating therewith, substantially as described.

3. The combination, in a lubricator, of the reservoir A, the stem B, having branch $a$, adapted to support the reservoir, and branch $b$, adapted to support the glass tube, the pipe D, extending from the stem B to the upper end of the reservoir, with the branch pipe $l$ between said pipe D and the glass tube, all substantially as described.

4. The combination, in a lubricator, of the reservoir, the steam-pipe D, adapted to be connected to a plug, H, said plug having a passage extending through one part thereof for the admission of steam and a second passage for the admission of oil to the reservoir, substantially as described.

In testimony whereof I have signed my name to this specification in the presence of two subscribing witnesses.

PHILLIP L. SCHMITT.

Witnesses:
J. B. THOMPSON,
WALTER DONALDSON.